United States Patent
Manghirmalani et al.

(10) Patent No.: US 12,267,235 B1
(45) Date of Patent: Apr. 1, 2025

(54) SWITCHOVER ACROSS NETWORK SERVICE PROVIDERS IN A LAST-MILE NETWORK

(71) Applicant: Amazon Technologies, Inc., Seattle, WA (US)

(72) Inventors: Ravi Manghirmalani, Fremont, CA (US); Sanjeev Gupta, Fremont, CA (US); Saikat Choudhury, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 17/751,547

(22) Filed: May 23, 2022

(51) Int. Cl.
*H04L 45/74* (2022.01)
*H04L 45/00* (2022.01)

(52) U.S. Cl.
CPC .............. *H04L 45/74* (2013.01); *H04L 45/70* (2013.01)

(58) Field of Classification Search
None
See application file for complete search history.

(56) References Cited

U.S. PATENT DOCUMENTS

| | | | | |
|---|---|---|---|---|
| 9,100,352 | B2* | 8/2015 | Zha | H04L 12/4641 |
| 11,497,068 | B2* | 11/2022 | Shanks | H04L 63/029 |
| 2004/0199662 | A1* | 10/2004 | Karol | H04L 63/0227 |
| | | | | 709/227 |
| 2004/0264465 | A1* | 12/2004 | Dunk | H04L 63/166 |
| | | | | 370/392 |
| 2007/0271453 | A1* | 11/2007 | Pohja | H04W 12/068 |
| | | | | 713/153 |
| 2007/0297430 | A1* | 12/2007 | Nykanen | H04W 12/069 |
| | | | | 370/408 |
| 2010/0172302 | A1* | 7/2010 | Dunk | H04L 61/00 |
| | | | | 370/328 |
| 2012/0254401 | A1* | 10/2012 | Adams | H04L 63/029 |
| | | | | 709/224 |
| 2014/0109174 | A1* | 4/2014 | Barton | H04W 12/06 |
| | | | | 726/1 |
| 2015/0043350 | A1* | 2/2015 | Basilier | H04L 63/0272 |
| | | | | 370/235 |
| 2015/0067819 | A1* | 3/2015 | Shribman | H04L 65/612 |
| | | | | 709/218 |
| 2016/0210209 | A1* | 7/2016 | Verkaik | G06F 11/2028 |
| 2017/0251515 | A1* | 8/2017 | Altman | H04W 24/02 |

(Continued)

*Primary Examiner* — Lonnie V Sweet
(74) *Attorney, Agent, or Firm* — Lowenstein Sandler LLP

(57) ABSTRACT

Technologies directed to performing switchover across Internet service providers in a last-mile network are described. One method includes receiving, by a first wireless device, a destination address, a first network address of a first network addressing scheme, and a first message. The method further includes determining a first status of at least one of a first NSP or a second NSP. The first NSP uses a second network addressing scheme and the second NSP uses a third network addressing scheme. The method further includes determining a second network address of the third network addressing scheme. The method further includes sending, using the second NSP the second network address and the first message. The method further includes determining a third network address of a fourth network addressing scheme and sending to a fourth wireless device corresponding to the destination address the third network address and the first message.

20 Claims, 8 Drawing Sheets

(56) References Cited

U.S. PATENT DOCUMENTS

| | | | | |
|---|---|---|---|---|
| 2018/0063743 | A1* | 3/2018 | Tumuluru | H04L 69/22 |
| 2019/0036876 | A1* | 1/2019 | Raza | H04L 61/2514 |
| 2020/0344084 | A1* | 10/2020 | Shribman | H04L 67/1008 |
| 2020/0351989 | A1* | 11/2020 | Ahmet | H04W 12/03 |
| 2022/0386215 | A1* | 12/2022 | Dillon | H04B 7/18519 |
| 2023/0188460 | A1* | 6/2023 | Parekh | H04L 45/28 |
| | | | | 370/225 |
| 2023/0319528 | A1* | 10/2023 | Pateromichelakis | H04W 4/44 |
| | | | | 455/420 |
| 2023/0336376 | A1* | 10/2023 | Shen | H04L 61/5014 |

* cited by examiner

SWITCHOVER ACROSS NETWORK SERVICE PROVIDERS IN A LAST-MILE NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. These electronic devices include one or more antennas to communicate with other devices wirelessly.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
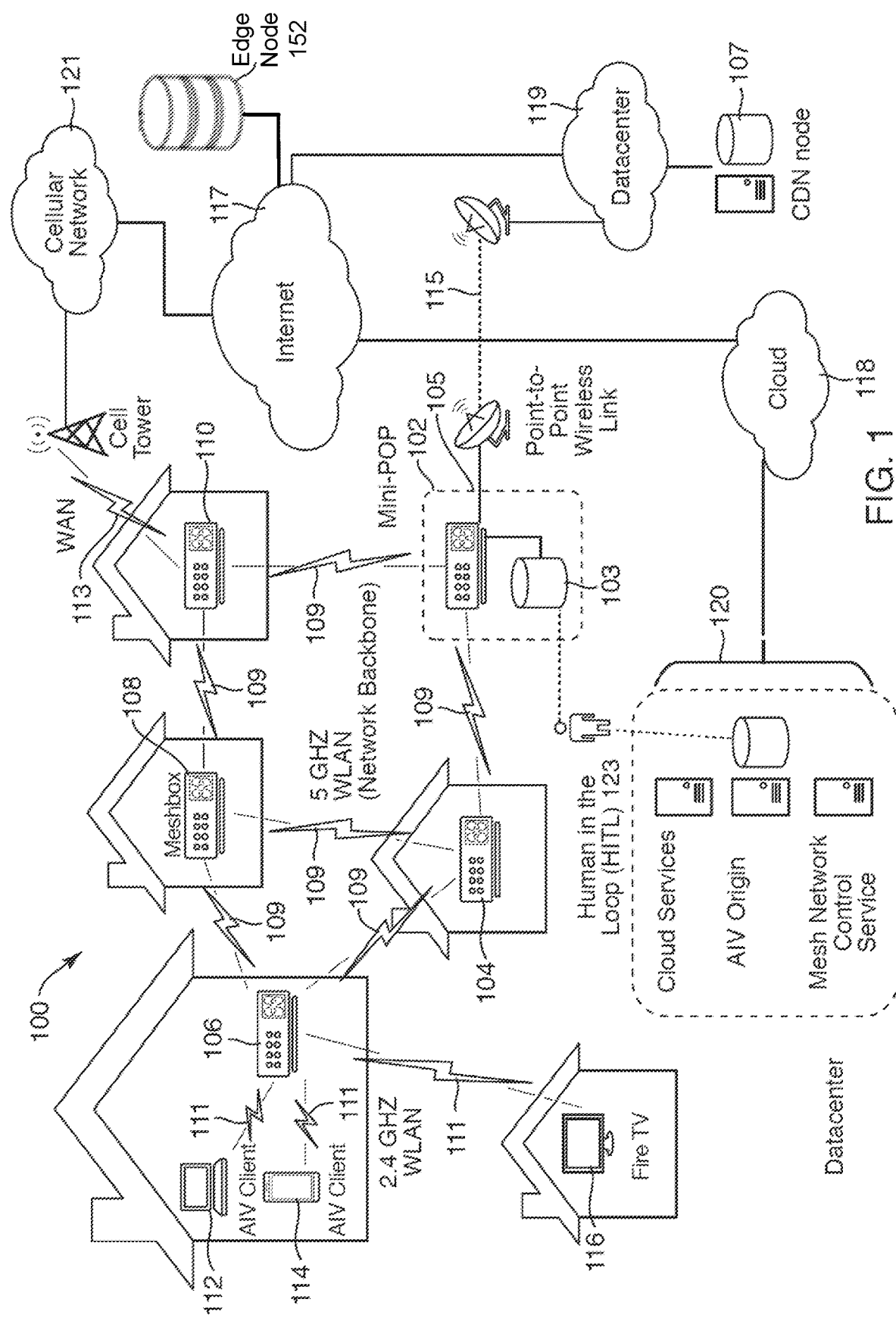
FIG. 1 is a component diagram illustrating hardware devices organized in a wireless network with an network service provider (NSP) switchover system with an edge node in accordance with embodiments of the present disclosure.

Technologies directed to performing switchover across NSPs in a last-mile network are described. The following architecture may provide seamless switchover between NSPs, such as providing uninterrupted experience to customers when switching between NSPs. A problem facing self-contained networks in some locations includes availability issues associated with network ingress or providing Internet backhaul to the network using a single NSP. For example, the availability of an NSP may be hindered based on aerial fiber cuts, power failures, and equipment failures, among other things.

One method for mitigating the effects of ISP network availability issues is employing multiple NSPs (e.g., a secondary backup NSP attachment) that may be used when conditions of a first (e.g., a primary NSP attachment) suffer from network availability constraints. Leveraging multiple NSPs presents challenges. For example, NSPs employ different IP addressing structures. A single customer flow needs to be addressed differently depending on which NSP transmits the traffic. So, if a first NSP is being used to send and receive data, it will have one network address translation (NAT) scheme that is different from another NAT scheme used by a second NSP to send and receive data. The different NAT schemes result in different address structures being generated for sending and receive data on the different NSPs. The different address structures may lead to breaking session traffic (e.g., accessing video-on-demand content) during switchover because the customer's traffic is addressed differently. The target or destination endpoint (e.g., content source such as website, streaming content library, and/or the like) may observe a different IP address that sources the same flow after the NSP switchover at the boundary of a last-mile network. A last-mile network is the network responsible for providing Internet to a network of devices. Breaking sessions resulting from the NSP switchover often leads to a sub-par customer experience.

Aspects of the present disclosure address the above and other deficiencies by employing an edge node within the data traffic architecture that handles the different IP addressing structures between the multiple NSPs. The edge node can reside in an Internet exchange center (IXC), an NSP data center, and/or inside a cloud resource data center (e.g., a cloud-based network performing cloud-based functions). The edge node performs the desired NAT and Internet protocol detail record (IPDR) generation for one or more last-mile networks in a scalable, reliable, and secure manner. A router node with an NSP switchover system transmits data through NSPs (e.g., tunnels or overlay networks) to the edge node (e.g., over WireGuard®, transport layer security (TLS), virtual extensible local area network protocol (VxLAN), a secure network tunnel, and/or the like) for each NSP. The edge node may perform a lightweight liveliness checks and provide NSP binding logic for each Router Node. The binding logic includes instructions for the router node in sending data to the edge node. For example, the liveliness checks provide a status of each of the NSPs and can be communicated to the router node. The NSP binding logic include instructions on which NSP to use in transmitting data to the edge node based on the status of each of the NSPs. The router node receives data from the serviced network destined for an internet addressable endpoint. The router node, based on the binding logic (e.g., a status of the individual NSPs), selects and transmits data to the edge node via the corresponding NSP. The edge node performs associated NAT to generalize (e.g., abstract) the network address of the delivered data. The delivered data may be transmitted along either NSP and the edge node may perform on demand NAT. The capability of switching between NSPs without causing delays in data transmission, device communication errors mitigates ongoing data transmission such as ongoing video streams, active viewership, and cache-fills as the source IP address of customer flows remains unchanged even in the face of NSP switchovers.

The network architecture described herein can provide Video on Demand (VOD) and Internet services to customers at scale. The network architecture described herein can be deployed in areas with limited, traditional NSP infrastructure, such as in India, for example. These services can be enabled by a combination of wired ingress, wireless connectivity, and tiered content caching in the network architecture described herein. At a high level, the network architecture of the wireless networks described herein is logically organized into hierarchical units, referred to herein as cell units, nodes, and devices, such as described and illustrated with respect to FIG. 1.

The embodiments described herein relate to a network architecture to deliver videos on demand (VOD) and Internet access to customers in locations with limited Internet infrastructure. The network architecture includes technology to distribute VoD and Internet services to customers using wired and wireless links. The network devices are organized into three logical units known as nodes: base station nodes (BSNs), relay nodes (RLNs), and customer premises equipment (CPE) nodes (also referred to as Home access nodes (HANs)). Each node supports a unique set of network functions. The CPE node provides connectivity for in-home customer devices (FireTV, laptop) to the outdoor wireless access network. RLN aggregates the wireless access traffic from the CPEs and passes this data back to a central BSN over a wireless distribution network. The BSN aggregates the RLN wireless distribution and local wireless access traffic to a fiber ingress point. The devices at the nodes can be manufactured as a common device type and programmed according to any of the following device roles: a router (RT) role, a base station (BS) role, a gateway (GW) role, a relay (RL) role, or a customer station (STA) role (e.g., a network station). That is, the devices can each include identical hardware and can each be programmed to operate as one of an RT, a BS, a GW, an RL, a customer STA, a NAS, or the like.

FIG. 1 is a component diagram illustrating hardware devices organized in a wireless network with an NSP switchover system with an edge node 152 in accordance with embodiments of the present disclosure.

As illustrated by FIG. 1, hardware devices 102-110 may be organized in a network 100 for content distribution to client devices in an environment of limited connectivity to broadband Internet infrastructure in order to transfer digital content to one or more client consumption devices. In the depicted embodiment, the network 100 includes a miniature point-of-presence (mini-POP) device 102 (also referred to as a mini-POP device), having at least one of a first wired connection to an attached storage device 103 or a point-to-point wireless connection 105 to a content delivery network (CDN) device 107 (server of a CDN or a CDN node) of an Internet Service Provider (NSP). In one embodiment, the mini-pop device 102 may be equipped with local storage which may be employed for storing a most popular subset of the content retrieved from the CDN server for serving to the client consumption devices 112, 114, 116. The CDN device 107 may be a POP device (also referred to as a POP device), an edge server, a content server device, or another device of the CDN. The mini-POP device 102 may be similar to the POP devices of a CDN in operation. However, the mini-POP device 102 is called a miniature to differentiate it from a POP device of a CDN, given the nature of the mini-POP device 102 being an ingress device to the network 100.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the network 100 for the content files stored in the network 100. The mini-POP 102 may be the only node in the network 100 having access to the attached storage and/or a communication channel to retrieve content files stored outside of the network 100. In other embodiments, multiple mini-POP devices may be deployed in the network 100, but the number of mini-POP devices should be much smaller than a total number of network hardware devices in the network 100. Although a point-to-point wireless connection can be used, in other embodiments, other communication channels may be used. For example, a microwave communication channel may be used to exchange data. Other long-distance communication channels may be used, such as a fiber-optic link, satellite link, cellular link, or the like. The network hardware devices of the network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

In some embodiments, the point-to-point wireless connection 105 may be carried out through one or more overlay networks, each associated with a corresponding NSP. For example, a primary overlay network may be the principal source of ingress to network 100, and one or more backup/alternate overly networks may be configured such that if a status of the primary overlay network does not meet certain operational criteria (e.g., liveliness and/or operational criteria) one or more secondary or alternate overlay networks may be used to transmit data in and/or out of network 100. The use of multiple overlay networks may provide improved data delivery in situations where a first NSP (e.g., first overlay network such as wireless link 115) is unreliable. Multiple NSPs (e.g., a secondary backup NSP attachment) may be used when conditions of a first (e.g., a primary NSP attachment) suffer from network availability constraints. The use of multiple NSPs may mitigate the effects of IPS network availability issues. Leveraging multiple NSPs presents challenges, as different NSPs often have different IP addressing structures. For example, a single customer flow needs to be addressed (e.g., performing network address translation (NAT)) differently depending on which NSP transits the traffic). The different addressing structures may lead to breaking session traffic (e.g., accessing video-on-demand content) during NSP switchover. The target or destination endpoint (e.g., content source such as website, streaming content library, and the like) may observe a different IP address sourcing the same flow after the NSP switchover at the boundary of the last-mile network (e.g., the network responsible for providing Internet to a network of devices). Breaking sessions resulting from the NSP switchover often leads to a sub-par customer experience.

As shown in FIG. 1, network 100 includes an edge node 152 (e.g., edge node, edge computing device, network address translation device, etc.) within the data traffic architecture. In some embodiments, the edge node 152 resides in an Internet exchange center (IXC) (e.g., associated with Internet 117), an NSP data center (e.g., data center of CDN device 107), and/or a cloud computing data center (e.g., of services 120). The edge node would perform the desired network address translation (NAT) and Internet protocol detail record (IPDR) generation for one or more last-mile networks in a scalable, reliable, and secure manner. The IPDR provides information about IP-based service usage and other activities that can be used by operation support system (OSSes) and business support system (BSSes). IPDR generation by the edge node in addition to or in alternative to the router node may provide easier access of IP-related data, diagnostics, data flow, and the like that may be useful for altering operational parameters of a network such as, for example, reallocating network load, detecting network errors (e.g., debugging), monitoring network traffic, and the like. A router node of a tiered network architecture runs tunnels (e.g., overlay networks) to the edge node (e.g., over WireGuardC), transport layer security (TLS), virtual extensible local area network protocol (VxLAN), a secure network tunnel, and/or the like) for each NSP. The edge node may perform a lightweight liveliness check on each NSP and provide NSP binding logic for each router Node. The CDN device 107 may be located at a data center 119 and may be connected to the Internet 117. The CDN device 107 may be one of many devices in the global CDN and may implement the Amazon CloudFront technology. The CDN device 107 and the data center 119 may be co-located with the equipment of the point-to-point wireless link 155. The point-to-point wireless connection 105 can be considered a broadband connection for the network 100. In some cases, the mini-POP device 102 does not have an Internet connection via the point-to-point wireless connection 105, and the content is stored only in the attached storage device 103 for a self-contained network 100. In such cases, the content stored on the attached storage device may from time to time be refreshed, e.g., by utilizing a removable storage device and/or by other suitable methods.

The network 100 also includes multiple mesh nodes 104, 106, 108, and 110, which may establish multiple P2P wireless connections 109 among themselves in order to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104, 106, 108, and 110 (and the mini-POP device 102) may be provided by multi-channel (MRMC) network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 104, 106, 108, and 110 communicate data with one another via the first set of WLAN channels at a first frequency of approximately 5 GHz (e.g., the 5 GHz band of the Wi-Fi® network technologies).

Each of the mesh nodes 104, 106, 108, and 110 (and the mini-POP device 102) also includes multiple node-to-client (N2C) wireless connections 111 to wirelessly communicate with one or more client consumption devices via a second set of WLAN channels reserved for serving content files to client consumption devices connected to the network 100. In particular, the second mesh node 106 is wirelessly coupled to a first client consumption device 112 (Amazon Instant Video (AIV) client) via a first N2C wireless connection 111, a second client consumption device 114 (AIV client) via a second N2C wireless connection 111, and a third client consumption device 116 (e.g., the Fire TV device) via a third N2C wireless connection 111. The second mesh node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104, 106, 108, and 110 (and the mini-POP device 102) also includes a cellular connection 113 to wirelessly communicate control data between the respective node and a second device 118 hosting a mesh network control service described below. The cellular connection 113 may be a low-bandwidth, high-availability connection to the Internet 117 provided by a cellular network. The cellular connection 113 may have a lower bandwidth than the point-to-point wireless connection 105. There may be many uses for this connection, including health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that hosts one or more services 120. The services 120 may include cloud services to control the setup of the mesh nodes, the content delivery service (e.g., AIV origin), and other cloud services. The mesh network control service can be one or more cloud services. The cloud services can include a metric collector service, a health and status service, a link selection service, a channel selection service, a content request aggregation service, or the like. There may be application programming interfaces (APIs) provided for each of these services. Although this cellular connection may provide access to the Internet 117, the amount of traffic that goes through this connection should be minimized since it may be a relatively costly link. This cellular connection 113 may be used to communicate various control data to configure the mesh network for content delivery. In addition, the cellular connection 113 can provide a global view of the state of the network 100 remotely. Also, the cellular connection 113 may aid in the debugging and optimizing the network 100. In other embodiments, other low bandwidth services may also be offered through this link (e.g., email, shopping on Amazon.com, or the like).

Although only four mesh nodes 104, 106, 108, and 110 are illustrated in FIG. 1, the network 100 can use many mesh nodes wirelessly connected together in a mesh network, to move content through the network 100. The 5 GHz WLAN channels are reserved for inter-node communications (i.e., the network backbone). Theoretically, there is no limit to the number of links a given mesh node can have to its neighbor nodes. However, practical considerations, including memory, routing complexity, physical radio resources, and link bandwidth requirements may limit the number of links maintained to neighboring mesh nodes. Mesh nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each mesh node can support depends on a number of factors, including memory, bandwidth requirements of the client, incoming bandwidth that the mesh node can support, and the like. For example, the mesh nodes provide coverage to users who subscribe to the content delivery service and consume that service through an AIV client on the client consumption devices (e.g., a mobile phone, a set-top box, a tablet, or the like). It should be noted that there is a 1-to-many relationship between mesh nodes and households (not just between nodes and clients). This means the service can be provided without necessarily requiring a customer to have a mesh node located in their house, as illustrated in FIG. 1. As illustrated, the second mesh node 106 services two client consumption devices 112, 114 (e.g., AIV clients) located in a first house, and a third client consumption device 116 (e.g., the Fire TV client) located in a second house. The mesh nodes can be located in various structures, and there can be multiple mesh nodes in a single structure.

The network 100 may be used to accomplish various tasks, including moving high bandwidth content to users and storing that content in the network itself. The content moving task may be performed by hardware using the radio links between mesh nodes and the radio links between mesh nodes and client consumption devices, and by software using the routing protocols used to decide where to push traffic and link and channel management used to configure the network 100. The content storing task may be performed using caches of content close to the user. An example CDN implementation is the AWS CloudFront service. The AWS CloudFront service may include several point-of-presence (POP) racks co-located in data centers that see a lot of customer traffic (for example, an NSP), such as illustrated in data center 119 in FIG. 1. A POP rack has server devices to handle incoming client requests and storage devices to cache content for these requests. If the content is present in the POP rack, the content is served to the client consumption device from the POP rack. If it is not stored in the POP rack, a cache miss is triggered, and the content is fetched from the next level of cache, culminating in the "origin," which is a central repository for all available content. In contrast, as illustrated in FIG. 1, the network 100 includes the mini-POP device 102 configured to handle smaller amounts of traffic than a typical POP rack. Architecturally, the mini-POP device 102 may be designed as a mesh node with storage attached (e.g., an external hard disk). The mini-POP device 102 may function identically to a POP device except for how cache misses are handled. Because of the lack of broadband Internet infrastructure, the mini-POP device 102 may have no traditional Internet connection to the next level of cache. Therefore, in one embodiment, the mini-POP device 102 may have a network connection (not necessarily an Internet connection) to handle the cache misses. In another embodiment, the mini-POP device may have no such a network connection and thus may not be capable of handling the cache misses.

The network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The network 100 has multiple devices, each with multi-radio multi-channel (MRMC) radios. The multiple radios for P2P connections and N2C connections of the network devices allow the network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. A "hop" as used herein may refer to a portion of a network path between two neighboring nodes.

The network 100 can provide adequate bandwidth, especially node-to-node bandwidth. For video, content delivery services recommend a minimum of 1.9 Mbps for standard definition content and 3.5 Mbps for high definition content. The network 100 can provide higher bandwidths than those recommended for standard definition and high definition content.

In some embodiments, the network 100 can be self-contained as described herein. The network 100 may be self-contained in the sense that content resides in, travels through, and is consumed by nodes in the mesh network without requiring the content to be fetched outside of the network 100. In other embodiments, the network 100 can have mechanisms for content injection and distribution. One or more of the services 120 can manage the setup of content injection and distribution. These services (e.g., the mesh network control service 125 and/or the mesh network management service 127) can be hosted by one or more cloud resources and operate as cloud services and may be executed by one or more computer systems 128A-128N, which may include servers and/or virtual machines. The mechanisms implemented by these services can be used for injecting content into the network as new content is created or as user viewing preferences change. In one embodiment, the content can be injected into the network 100 via the point-to-point wireless connection 105 or the HITL process at the mini-POP device 102. In one embodiment, the mesh network control service 125 may include a content replication engine implementing the content replication methods described herein.

In some embodiments, before consumption by a node having an AIV client itself or being wirelessly connected to an AIV client executing on a client consumption device, the content may be pulled close to that node. This may involve implementing various replication and caching strategies based on predicting when content will be consumed to proactively move it closer and/or always have it close.

The network 100 can provide some fault tolerance so that a single mesh node becoming unavailable for failure or reboot has minimal impact on the availability of content to other users. The network 100 can be deployed in an unpredictable environment. Radio conditions may not be constant and sudden losses of power may occur. The network 100 is designed to be robust to temporary failures of individual nodes. The network 100 can be designed to identify those failures and adapt to these failures once identified. Additionally, the network 100 can include mechanisms to provide secure storage of the content that resides within the network 100 and prevent unauthorized access to that content.

The cloud services 120 of the network 100 can include mechanisms to deal with mesh nodes that become unavailable, adding, removing, or modifying existing mesh nodes in the network 100. The cloud services 120 may also include mechanisms for remote health and management. For example, there may be a remote health interface, a management interface, or both to access the mesh nodes for this purpose. The cloud services 120 can also include mechanisms for securing the network 100 and the content that resides in the network 100. For example, the cloud services 120 can control device access, digital rights management (DRM), and node authentication.

Other use cases of networks operating in accordance with embodiments of the present disclosure include employing mesh networks for residential, office, campus/community, and public safety uses. In one example, mesh networks described herein may be employed to eliminate radio frequency dead spots and areas of low-quality wireless coverage in private residences or public spaces. In another example, mesh networks described herein may be employed to provide network access to emergency and safety personnel such as fire, police, and emergency medical technicians responding to an incident scene. Possible use cases of mesh networks operating in accordance with the embodiments of the present disclosure are not limited to the above-described examples.

Figure 2:
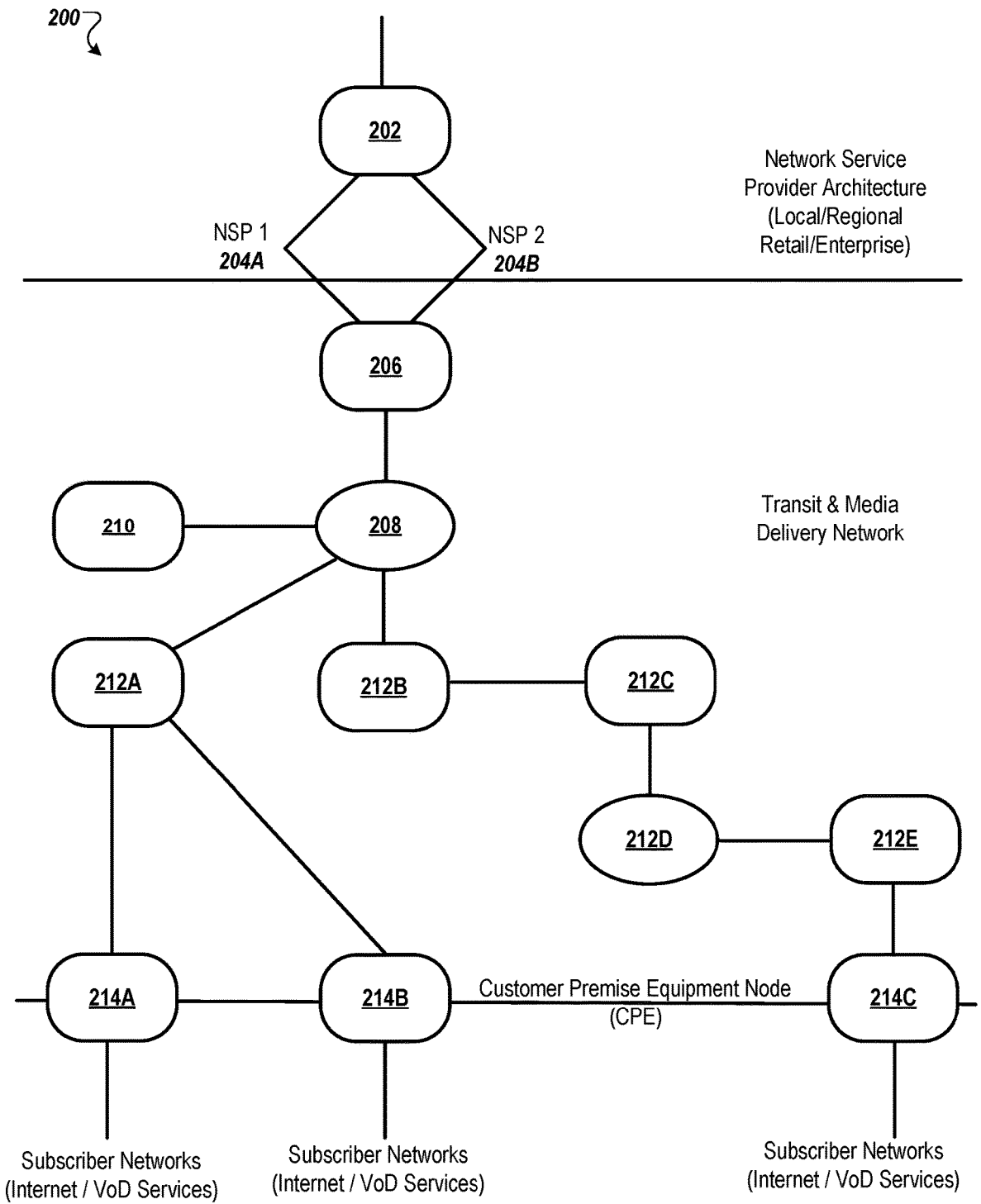
FIG. 2 is a functional network diagram of an illustrative example of a wireless network with tiered network topology having NSP switchover system with an edge node in accordance with embodiments of the present disclosure.

FIG. 2 is a functional network diagram of an illustrative example of a wireless network 200 with tiered network topology having NSP switchover system with an edge node 202 in accordance with embodiments of the present disclosure. In one embodiment, each of the network devices of wireless network 100 of FIG. 1 may implement functions of one or more functional components of FIG. 2. In other embodiments, various other wireless mesh networks may include hardware and/or software components that may implement functions of one or more functional components of FIG. 2.

As schematically illustrated by FIG. 2, an example wireless network 200 may include an edge node 202, a router node 206, storage node 210, one or more base station nodes (BSNs) 208, relay nodes (RLNs) 212A-E, and customer premises equipment (CPE) nodes 214A-C (also referred to as Home access node (HAN)). Each node supports a unique set of network functions. The CPE node provides connectivity for in-home customer devices (FireTV, laptop) to the outdoor wireless access network. RLN aggregates the wireless access traffic from the CPEs and passes this data back to a central BSN over a wireless distribution network. The BSN aggregates the RLN wireless distribution and local wireless access traffic to a fiber ingress point. The router node 206 performs data alterations to communicate with a device outside the downstream network (e.g., the BSNs, RLNs, CPEs, etc.) For example, the router node 206 performs the necessary network address translation (NAT) of network addresses in and out of the downstream network. For example, the router node includes a router device configured to provide backhaul to the downstream network (e.g., the BSNs, RLNs, CPEs, etc.). The router node 206 further determines a liveliness status of one or more NSPs 204A-B (e.g., overlay networks). The router node 206 selects an NSP 204A-B. The edge node 202 performs data alteration to a data flow and abstracts historical NSP usage for a given flow of data. For example, the edge node 202 includes an edge device configured to perform NAT of the various data that is received from the multiple NSPs. The devices at the nodes can be manufactured as a common device type and programmed according to any of the following device roles: a router (RT) role, a base station (BS) role, a gateway (GW) role, a relay (RL) role, or a customer station (STA) role. That is, the devices can each include identical hardware and can each be programmed to operate as a one of an RT, a BS, a GW, an RL, a customer STA, a NAS, or the like.

In one embodiment, the wireless network 200 may be compliant with IEEE 802.11s protocol, which supports broadcast/multicast and unicast delivery using radio-aware path selection metrics over self-configuring multi-hop topologies.

One or more network nodes may include a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

Figure 3A:
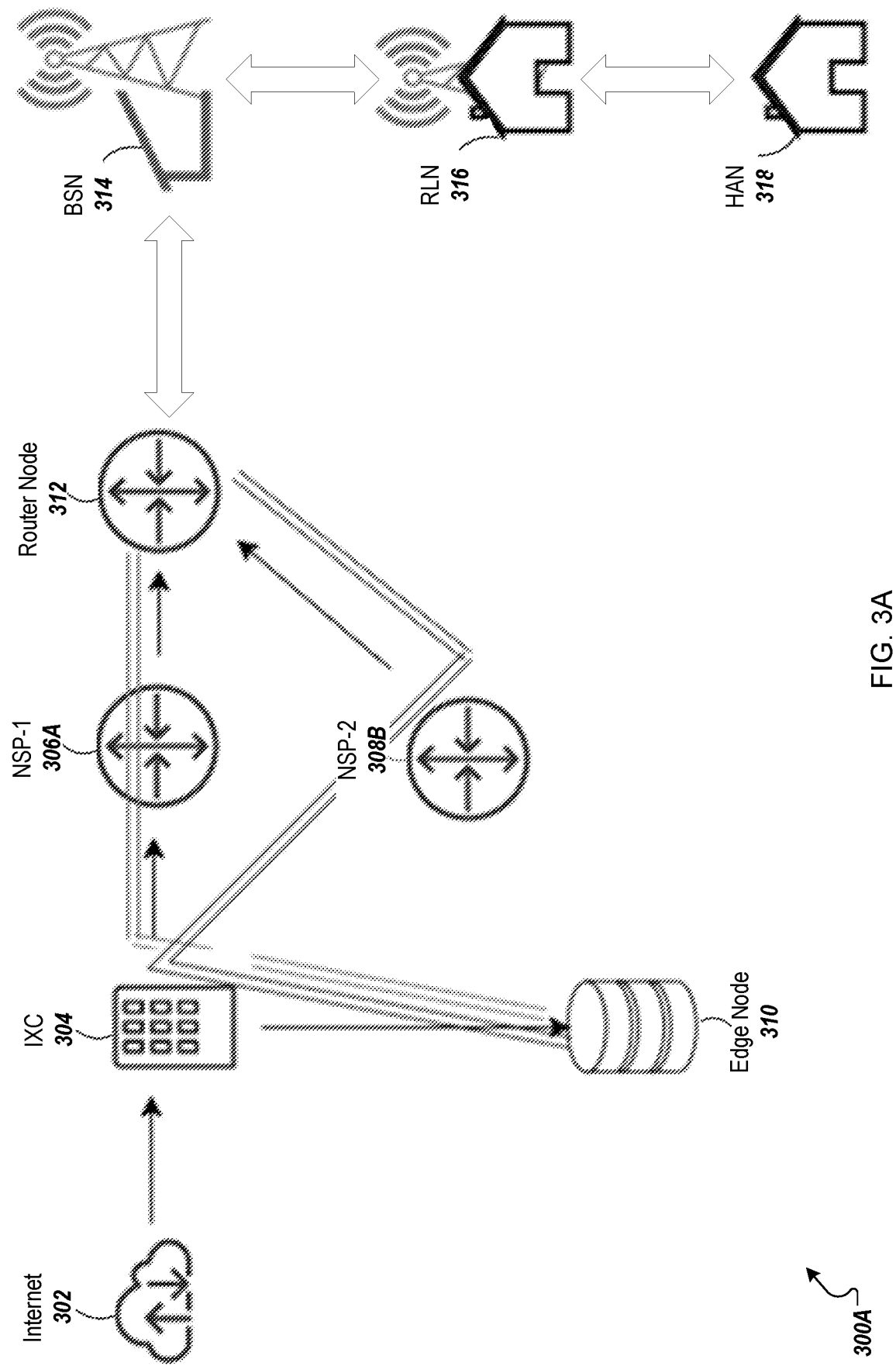
FIGS. 3A-C illustrate example embodiments of a network capable of performing NSP switchover in accordance with embodiments of the present disclosure.
Figure 3B:
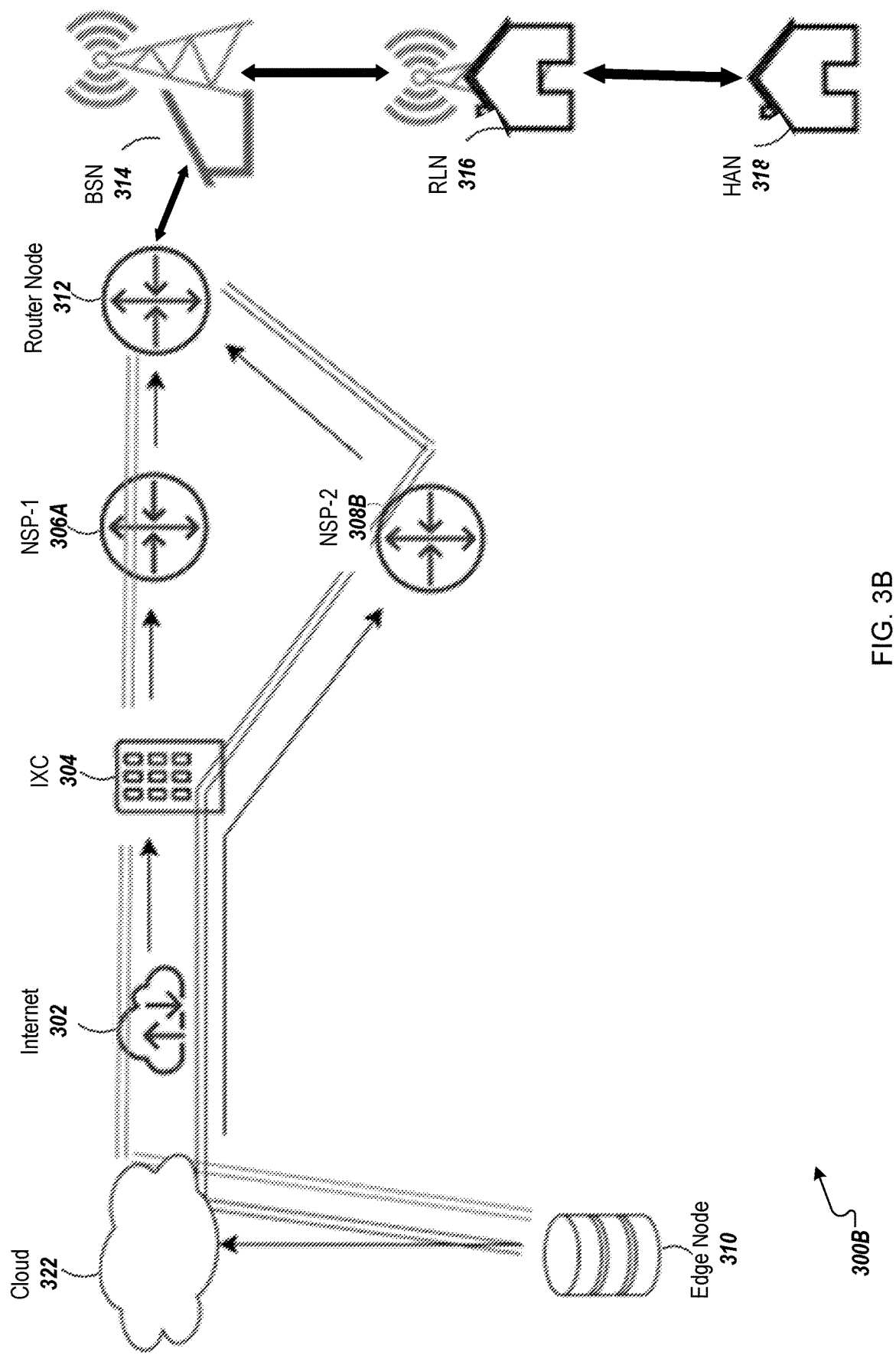
Figure 3C:
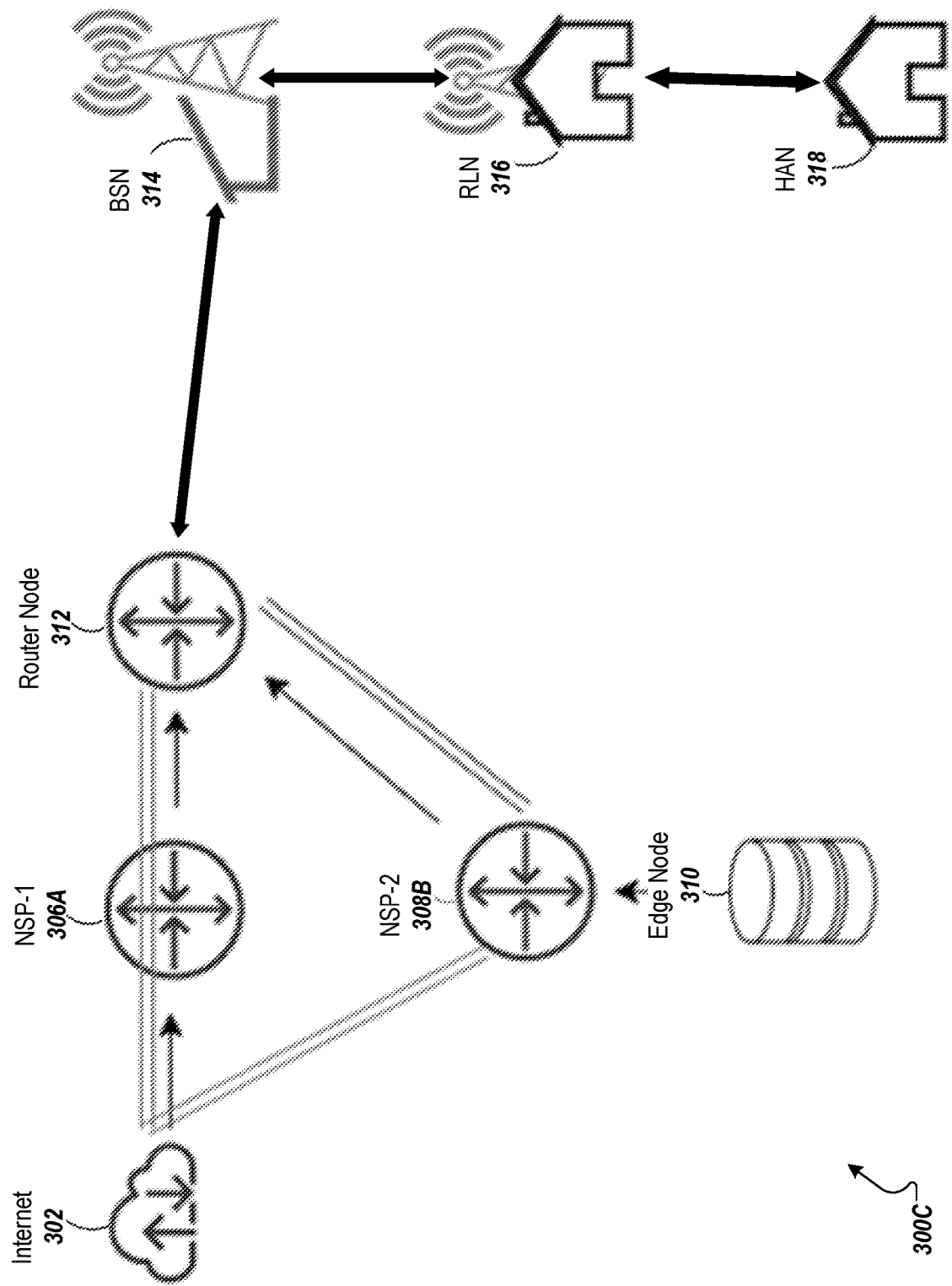

FIGS. 3A-C illustrate example embodiments of networks 300A-C capable of performing Internet service provider switchover in accordance with embodiments of the present disclosure.

As shown in FIG. 3A, network 300A includes a router node 312 that directs data between the Internet 302 and a collection of downstream nodes (e.g., a local area network (LAN) including BSN 314, RLN 316, and HAN). Network 300A includes a first NSP 306A (e.g., a first overlay network) and a second NSP 306B (e.g., a second overlay network). Network 300 further includes an edge node 310 located proximate to an Internet exchange center 304 (IXC).

The NSPs 306A-B terminate at the IXC directly or indirectly via a partnered provider. The Internet 302 may be accessible directly from the IXC. In this case, the first overlay network runs from router node 312 to edge node 310 hosted at the IXC via the first NSP 306A, while the second overlay network runs from the router node to the edge node 310 hosted at IXC via the second NSP 308B. The endpoints of the overlay network running through NSP 308A have Internet protocol (IP) addresses routable and known in the first NSP hierarchy of devices. Similarly, the endpoints of the overlay network running through NSP 308B have IP addresses routable and known within the second NSP hierarchy of devices.

In operation, data packets (destined to the Internet) originating from any one or more customer devices (e.g., BSN 314, RLN 316, and/or 318) are transmitted to the router node 312. The router node 312 may determine which of the overlay networks to route the data packet. The router node 312 may select based on the packet or link status, one of the tunnel-links attached to first NSP 306A (sometimes referred to as NSP 1) or second NSP 308B (sometimes referred to as NSP 2). Connectivity (e.g., underlay network) between the router node 312 and edge node 310 may be pre-established. Data packets flow out of Router Node to the NSP 1 or NSP 2 domain via a tunnel (overlay network). The packets are routed from the NSP 1 or NSP 2 domain to the edge node 310 via the IXC 304. When the packet arrives at edge node 310, it can be tracked against the correct NSP it was sourced from based on the source IP. The edge node may generate a corresponding IPDR record based on the data flow. The edge node performs NAT of the encapsulated packet to deliver the data packet to an Internet addressable endpoint.

Conversely, data packets transiting from the Internet addressable endpoint and destined for the customer devices (e.g., BSN 314, RLN 316, and HAN 318) reach the edge node 310 using and IP address that identifies the edge node. The edge node 310 routes the data packet to the correct tunnel based on a NAT entry created for that flow. In some embodiments, NAT entry may become invalid while an NSP is unreachable. The edge node 310 can switch to the other bonded IP address of the tunnel (e.g., corresponding to NSP 2 network 308B) to the router node 312, which takes it via the reachable NSP. In some embodiments, if both NSPs 306A-B are unreachable, the edge node 310 may drop the packet until the Router Node reconnects and establishes a new association of tunnel endpoints. In some embodiments, the network may include more than 2 NSPs and may cycle to a third NSP, a fourth NSP, a fifth NSP, and so on.

In some embodiments, the edge node 310 maintains two mapping tables for correctly forwarding the reverse traffic and performing NAT for various data packet flows and the bonded tunnel IP addresses of the router node 312. The first mapping table (e.g., NAT Table) is populated with customer flows, while the second mapping table includes the tunnel control protocol with the router node. The tunnel control protocol provides the bonded tunnel IP addresses of the router node and the overlay network, and a status signal (e.g., lightweight heartbeat) is regularly transmitted back and forth to maintain a liveliness status of the corresponding overlay tunnel. The first mapping tables maps network addresses of NSPs to network addresses that operate independent each of the NSPs.

An example of the mapping table for identifying the NSP/tunnel identification (ID) by the edge node 310 may include the following entries:

TABLE 1

| NAT IP | Customer IP (Private IP) | Tunnel ID | Tunnel Destination IP |
|---|---|---|---|
| 200.1.1.2 | 10.1.1.1 | Tunnel ID 1 | 100.1.1.1 |
| 200.1.1.3 | 10.1.1.1 | Tunnel ID 2 | 100.2.1.1 |

The NAT IP represents a network address exchanged between the edge node 310 and the Internet addressable endpoint (e.g., Internet addressable endpoint device, content source, destination address of packets coming from the customer devices. For data destined for the customer devices, the edge node 310 receives the NAT IP and identifies the customer IP (e.g., a private network address of an individual device or cluster of devices) of one or more customer devices (e.g., BSN 314, RLN 316, and/or HAN 318). The tunnel ID identifies the NSP to use for a given data transfer and an associated network address corresponding to the identified tunnel.

An example of a mapping table indicating tunneling protocol that may be stored on the Edge node 310 and/or the router node 312 may include the following entries:

TABLE 2

| Tunnel ID | Tunnel Destination IP | Source IP | Source Port | Destination Port |
|---|---|---|---|---|
| Tunnel ID 1 | 100.1.1.1 | 200.1.1.1 | X1 | Y1 |
| Tunnel ID 2 | 100.2.1.1 | 200.1.1.1 | X2 | Y2 |

Table 2 indicates an ID of each tunnel and a network address associated with the destination the data is to travel. For example, the tunnel destination IP may identify the router node IP address for each NSP. The source IP indicates a network address associated with the edge device that is agnostic to any NSP. Table 2 further indicates end ports of each of the NSP tunnels. Flows of sample data packets are discussed further in association with FIGS. 4 and 5.

The router node 312 may include a mapping table that maps one or more private IP addresses of a customer device and one or more public IP addresses that each identifies the router and a corresponding individual NSP. For example, the router node 312 may be identified using multiple public IP addresses where each network address corresponds to a particular NSP. An example mapping table that may be generated to track resource usage (e.g., NSP tunnel usage) stored at the router node may include the following entries:

TABLE 3

| Customer ID (Private IP) | NSP-1 ID (Public IP) | NSP-2 ID (Public IP) |
|---|---|---|
| 10.1.1.1 | 100.1.1.1 | 100.2.1.1 |
| 10.1.1.2 | 100.1.1.2 | 100.2.1.2 |

Table 3 indicates the association between a customer ID representing a private IP address that identifies one or more of the customer devices (e.g., BSN 314, RLN 316, and HAN 318), a first NSP ID representing a public IP address that corresponds to a first NSP, and a second NSP ID representing a public IP address that corresponds to a second NSP. Each customer device is noted by the router node 312 using a unique address. The router node 312 uses Table 3 to perform NATs between addresses within the private network and outside the private network.

In some embodiments, the router node 312 and/or the edge node 310 stores a copy of one or more of Table 1, Table 2, and/or Table 3. In some embodiments, the router node 312 and/or the edge node 310 include a virtual Internet protocol (VIP) load balancer. For example, load balancing may include a way to distribute traffic coming from the Internet to the router node 312 and/or the edge node 310. One or more of the router node 312 and/or the edge node 310 may include a virtual IP (VIP) in front of real servers with IPs (RIPs). The load balancer performs as the VIP, and one or more real servers (e.g., customer devices, cloud computing resources, NSP processing resourcing, etc.) are disposed beyond the virtual IP layer.

As shown in FIG. 3A and as previously discussed, network 300A includes edge node 310 positioned within or proximate to the IXC 304. For example, the edge node 310 may receive data from the IXC on a LAN of the IXC. In another example, the edge node 310 may receive data from the IXC using a wired connection onsite the IXC. In another example, the edge node 310 may receive data from the IXC using a short-range signal at or near the IXC.

FIGS. 3B-C illustrate other embodiments of networks 300B-C that include overlapping devices, nodes, and concepts but different in hardware configuration and the flow of data. As shown in FIG. 3B, network 300B illustrates customer devices (e.g., BSN 314, RLN 316, and HAN 318) communicatively coupled to the router node 312. Similar to network 300A, network 300B includes multiple NSPs 306A-B, an IXC 304, and an edge node 310. A difference between network 300A and network 300B is that the edge node resides in cloud 322 and includes a public routable IP address. Using the edge node 310 within the cloud 322 may allow for increased control as the cloud-based data center that stores the edge node 310 may be monitored and controlled onsite the cloud resource data center. For example, if less or more resources are needed to perform the various functions of the edge node 310, the cloud can leverage dynamic resource allocation, allowing for auto-scaling and reliability of computing resources, processing bandwidth, and/or data storage resources. This solution might involve increased latency because of added hops undertaken to reach the Internet destination via the cloud waypoint back-and-forth and higher costs for egressing network traffic from the cloud. However, this scenario is good for auto-scaling and reliability of the Edge Node. In some embodiments, cloud 322 one or more details of the cloud data center discussed in association with services 120 of FIG. 1.

In operation, a data packet sourced by a customer device is received by router 312. The router evaluates a status of one or more NSPs 306A-B. An NSP 306A-B is selected, and the data packet transitions to IXC 304. The IXC identifies the source of the data packet from an associated NSP 306A-B. The data packet is delivered through Internet 302 to a cloud data center 322 (e.g., server, processors, memory devices, etc.) that houses edge node 310. For example, the data packet is delivered to an ingress node of the cloud network and is further delivered to the edge node. The edge node 310 abstracts the source network address of the data packet such that the destination endpoint receives the data packet from a network address indicating the edge node. The edge node 310 employs a unique network address for the various possible NSPs the data packet may use to arrive at the edge node. For example, as shown in Table 1, the edge node may leverage a unique NAT IP. One advantage of using a unique IP address allows for the edge node 310 to select the same NSP 308A-B leveraged in a first data flow direction in reverse of the data flow direction. The edge node 310 monitors the status of the NSPs 306A-B and can determine to send a data packet along a different NSP if the primary network (e.g., the NSP used to send a first data packet to which a response packet is currently being delivered) does not meet performance criteria.

As shown in FIG. 3C, network 300C includes many of the features of networks 300A-B. One difference between network 300C and networks 300A-B is that the edge node 310 is disposed inside an NSP premises and/or data center. In this topology, network 300C includes two NSPs (e.g., NSP 1 and NSP 2). A first NSP 306A (e.g., tunnel or overlay network) runs from the router node to the Internet 302 and from the internet to the edge node 310. The edge node 310 is disposed in a data center associated with the second NSP. For example, the edge node is hosted on NSP 2 premises and can be accessed using the second NSP 308B. In some embodiments, the IP address assigned to the edge node includes a publicly routable address. The underlay network ensures the reachability of the endpoints. The operation is similar to that described in Scenario 1. Whenever the reachability is broken, a trigger is sent to ensure that the link should not be used for the overlay (tunnel) for sending any traffic. The methodology proceeds as described in method 400 and method 500 with the edge device disposed at a datacenter of an NSP (e.g., accessed using an overlay network of the NSP).

Figure 4:
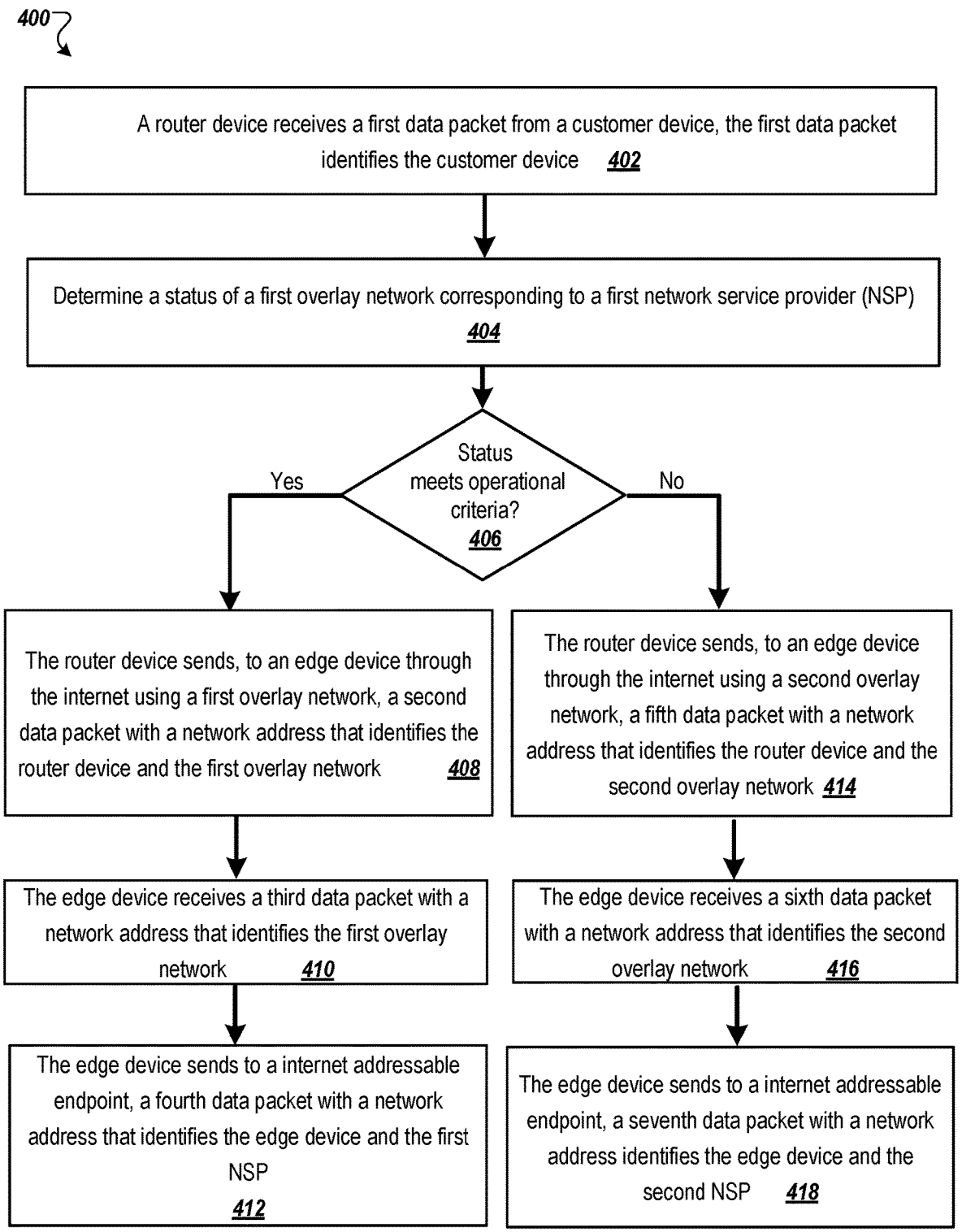
FIG. 4 is a flow diagram of a method of operation for NSP switchover according to at least one embodiment.

FIG. 4 is a flow diagram of a method 400 of operation for NSP switchover according to at least one embodiment. Method 400 represents an example data flow of a data packet originating from a customer device (e.g., a BSN, an RLN, a HAN, etc.) and destined for an Internet addressable endpoint. Method 400 may be performed by processing logic that includes hardware (e.g., circuitry, dedicated logic, programmable logic, microcode, etc.), software (e.g., instructions run on a processor to perform hardware simulation), or a combination thereof. In some embodiments, the method 400 may be performed by one or more components of network 100 and/or network 200.

Referring to block 402, a router device receives a first data packet from a customer device. The first data packet identifies the customer device. For example, the first data packet may include a source IP address, such as, for example, a private network IP address identifying one or more devices of a self-contained network. The router device may further identify a destination address of an Internet addressable endpoint (e.g., content source device). The first data packet may include a payload (e.g., a message). In some embodiments, the router device may perform NAT on the first data packet and convert the private IP address to a public IP address associated with a particular NSP (e.g., an overlay network). For example, one or more entries of a mapping table (e.g., Table 3) may be used to convert the private IP address to a public IP address associated with an NSP. The private IP address may be of a first network address scheme (e.g., a private IP addressing scheme) and each public IP address that corresponds with the private IP address may correspond to a public IP address of network addressing schemes associated with a corresponding NSP (e.g., a first public IP addressing scheme, a second public IP addressing scheme, a third public IP addressing scheme, and so forth). In some embodiments, the router device encapsulates the first data packet using routes the encapsulated data using downstream processes (e.g., block 406 and 408)

At block 404, processing logic determines a status of a first overlay network corresponding to a first NSP. Determining the status may include performing a liveliness check of the NSP. In some embodiments, the status and/or performance criteria of the network may be evaluated on one or more of a multitude of factors that may include cost, quality, speed, reliability, and the like. In some embodiments, the router device may determine a status of an NSP based on temporal factors such as time of day, day of the week, etc. In some embodiments, the status of the NSP may be based on the source IP address of the data packets (e.g., which of the customer devices did the data packet originate from). In some embodiments, a status of multiple NSPs is evaluated to determine which NSP to use.

At block 406, processing logic determines whether the status of one or more NSPs meets operational criteria. For example, processing logic determines a liveliness evaluation of one or more NSPs and selects an NSP to transmit the data packet from the router device to the Internet. In some embodiments, processing logic determines that a first NSP meets target operational criteria (e.g., threshold liveliness, threshold processing bandwidth, threshold network load, and the like) and proceeds along the yes path to block 408. In some embodiments, processing logic determines that a first NSP does not meet operational criteria (e.g., liveliness, processing bandwidth, network load, and the like) and proceeds along the no path to block 414.

At block 408, the router device sends, to an edge device through the Internet using a first overlay network, a second data packet with a network address that identifies the router device and the first overlay network. The network address may include a public IP address assigned by the first NSP and is unique from a public IP address used to identify the router device by the second NSP. For example, the public network address assigned by the first NSP may be of a first network addressing scheme and the public network address assigned by the second NSP may be of a second network addressing scheme. The router device may leverage one or more mapping tables (e.g., Table 1 and/or Table 2) that outline the endpoints (e.g., ports) of the first overlay network and the protocol for using the identified overlay network. For example, processing logic may determine an updated network address of a first NSP associated network addressing scheme based on the received network address. In some embodiments, the second data packet includes the first payload/message of the first data packet and further includes a destination address that identifies the Internet addressable endpoint identified in the first data packet.

At block 410, an edge device receives a third data packet with a network address that identifies the first overlay network. For example, the third data packet may include an IP address that identifies a gateway of the NSP and/or a unique IP address used by the router device that corresponds to the first NSP. In some embodiments, the edge device encapsulates the third data packet and performs NAT between the private network addressing scheme and the first or second public addressing scheme.

In some embodiments, the router performs one or more described actions above.

However, in other embodiments, the router device performs encapsulation and decapsulation and the edge device performed one or more of the functions described in association with the router device.

At block 412, the edge device sends a fourth data packet to an Internet addressable endpoint. The fourth data packet includes a network address identifying the edge device and the first NSP. The network address may be of a network addressing scheme independent of the first NSP and the second NSP. For example, the network address may be agnostic to NSPs and be a publicly accessible network address. For example, the edge device identifies which overlay network is used to receive the third data packet and performs NAT. The edge device may leverage a mapping table (e.g., Table 1) to determine a new network address that indicates the edge device and communicates which of the NSPs was used to acquire the data. The edge device sends the fourth data packet with the updated network address to the Internet addressable endpoint.

In some embodiments, as discussed in association with FIGS. 3A-C, the edge device may be located proximate to an IXC, in a cloud-based data center, and/or a data center associated with an NSP (e.g., a first NSP or a second NSP). Method 400 may include further processing procedures outlined in FIGS. 3A-C to account for the positioning of the edge device within the Internet. For example, the edge device may receive the third data packet through a waypoint (e.g., an ingress node of a cloud network) corresponding to a cloud-based processor and/or storage element. In another example, the edge device may receive the third data packet from the Internet (e.g., an IXC) using an overlay network associated with an NSP not used in block 408 (e.g., the first overlay network).

At block 414, the router device sends, to an edge device through the Internet using a first overlay network, a fifth data packet with a network address that identifies the router device and the second overlay network. The network address may include a public IP address that is assigned by the second NSP and is unique from a public IP address used to identify the router device by the first NSP. For example, the public network address assigned by the first NSP may be of a first network addressing scheme and the public network address assigned by the second NSP may be of a second network addressing scheme. The router device may leverage one or more mapping tables (e.g., Table 1 and/or Table 2) that outline the endpoints (e.g., ports) of the second overlay network and the protocol for using the identified overlay network. For example, the router device may leverage Table 1 to determine a network address of a public IP addressing scheme based on the received network address of a private IP addressing scheme. In some embodiments, the fifth data packet includes the first payload/message of the first data packet and further includes a destination address that identifies the Internet addressable endpoint identified in the first data packet.

At block 416, an edge device receives a sixth data packet with a network address that identifies the first overlay network. For example, the sixth data packet may include an IP address that identifies a gateway of the NSP and/or a unique IP address used by the router device that corresponds to the first NSP.

At block 418, the edge device sends an seventh data packet to an Internet addressable endpoint. The seventh data packet includes a network address identifying the edge device and the second NSP. The network address may be of a network addressing scheme independent of the first NSP and the second NSP. For example the network address may be agnostic to NSPs and be a publicly accessible network address. For example, the edge device identifies which overlay network is used to receive the seventh data packet and performs NAT. The edge device may leverage a mapping table (e.g., Table 1) to determine a new network address that indicates the edge device and communicates which of the NSPs was used to acquire the data. The edge device sends the fourth data packet with the updated network address to the Internet addressable endpoint.

In some embodiments, as discussed in association with FIGS. 3A-C, the edge device may be located proximate to an IXC, in a cloud-based data center, and/or a data center associated with an NSP (e.g., a first NSP or a second NSP). Method 400 may include further processing procedures outlined in FIGS. 3A-C to account for the positioning of the edge device within the Internet. For example, the edge device may receive the third data packet through a waypoint corresponding to a cloud-based processor and/or storage element. In another example, the edge device may receive the third data packet from the Internet (e.g., an IXC) using an overlay network associated with an NSP not used in block 414 (e.g., the second overlay network).

Figure 5:
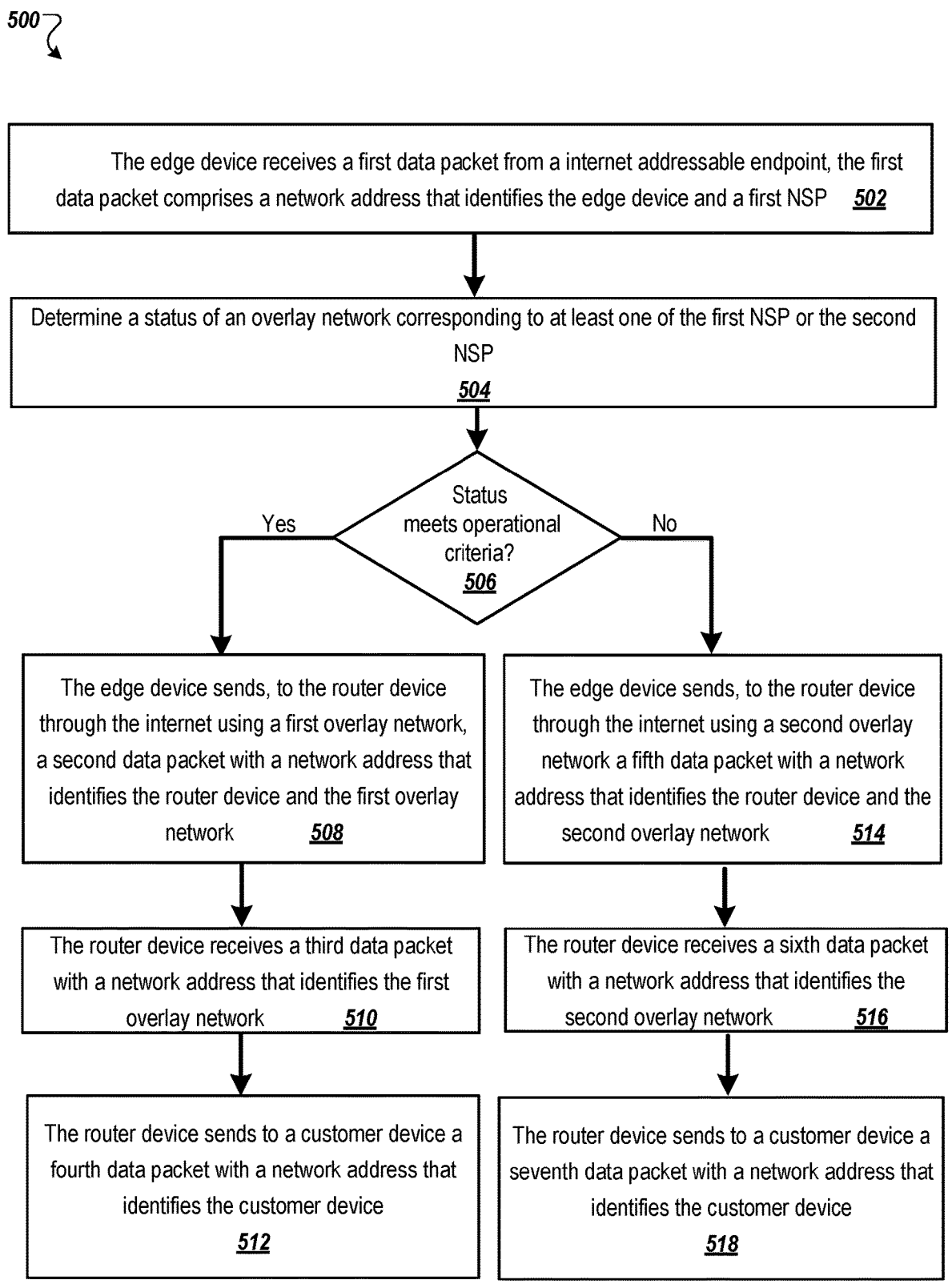
FIG. 5 is a flow diagram of a method of operation for NSP switchover according to at least one embodiment.

FIG. 5 is a flow diagram of a method 500 of operation for NSP switchover according to at least one embodiment. Method 500 represents an example data flow of a data packet originating from an Internet addressable endpoint and destined for a customer device (e.g., a BSN, an RLN, a HAN, etc.). In some embodiments, method 500 is performed responsive to carrying out method 400. Method 500 may be performed by processing logic that includes hardware (e.g., circuitry, dedicated logic, programmable logic, microcode, etc.), software (e.g., instructions run on a processor to perform hardware simulation), or a combination thereof. In some embodiments, the method 500 may be performed by one or more elements of network 100 and/or network 200.

Referring to block 502, the edge device receives a first data packet from an Internet addressable endpoint. The first data packet includes a source address that identifies a device corresponding to the Internet addressable endpoint. The first data packet further includes a destination address identifying the edge device and the first NSP. In some embodiments, the first data packet is received in response to transmitting a previous data packet sent using an overlay network corresponding to the first NSP. The destination address is of a network addressing scheme separate from the first NSP and the second NSP. For example, the network addressing schemes operates independent of the first NSP and the second NSP.

At block 504, processing logic determines a status of a first overlay network corresponding to a first NSP. Determining the status may include performing a liveliness check of the NSP. In some embodiments, the status and/or performance criteria of the network may be evaluated on one or more of a multitude of factors that may include cost, quality, speed, reliability, and the like. In some embodiments, the router device may determine a status of an NSP based on temporal factors such as time of day, day of the week, etc. In some embodiments, the status of the NSP may be based on the source IP address of the data packets (e.g., which of the customer devices did the data packet originate from). In some embodiments, a status of multiple NSPs is evaluated to determine which NSP to use. In some embodiments, the primary NSP or default NSP may correspond to an overlay network used to transmit a previous data packet to the Internet addressable endpoint.

At block 506, processing logic determines a status of a first overlay network corresponding to a first NSP. Determining the status may include performing a liveliness check of the NSP. In some embodiments, the status and/or performance criteria of the network may be evaluated on one or more of a multitude of factors that may include cost, quality speed, reliability, and the like. In some embodiments, the router device may determine a status of an NSP based on temporal factors such as time of day, day of the week, etc. In some embodiments, the status of the NSP may be based on the source IP address of the data packets (e.g., which of the customer devices did the data packet originate from). In some embodiments, a status of multiple NSPs is evaluated to determine which NSP to use.

At block 508, the edge device sends a second data packet to the router device through the Internet using a first overlay network. The second data packet includes a network address identifying the router device and the first overlay network. The network address may include a public IP address assigned by the first NSP that is unique from a public IP address used to the router device by the second NSP. For example, the public network address assigned by the first NSP may be of a first network addressing scheme (e.g., based on a private IP) and the public network address assigned by the second NSP may be of a second network addressing scheme. The edge device may leverage one or more mapping tables (e.g., Table 1 and/or Table 2) that outline the endpoints (e.g., ports) of the first overlay network and the protocol for using the identified overlay network. In some embodiments, the second data packet includes the first payload/message of the first data packet and further includes a destination address that identifies the customer device. For example, the edge device may determine an updated network address based on the received network address and append the payload to a new message.

At block 510, the router device receives a third packet with a network address that identifies the first overlay network (e.g., the network address is of a network addressing scheme corresponding to the first NSP). For example, the third data packet may include an IP address that identifies a gateway of the NSP and/or a unique IP address used by the router device that corresponds to the first NSP.

At block 512, the router device sends to a customer device a fourth data packet with a network address indicating a customer device. For example, the first data packet may include a destination IP address, such as, for example, a private network IP address identifying one or more devices of a self-contained network (e.g., of a network addressing scheme corresponding to the self-contained network). The router device may further identify the destination address within the network based on a received public IP address received by the router device. The router device may perform NAT on the first data packet and convert the public IP address (e.g., associated with the first NSP) to a private IP address. For example, one or more entries of a mapping table (e.g., Table 3) may be used to convert the public IP address associated with the first NSP to a private IP address.

At block 514, the edge device sends a fifth data packet to the router device through the Internet using a second overlay network. The fifth data packet includes a network address identifying the router device and the second overlay network. The network address may include a public IP address assigned by the second NSP and is unique from a public IP address used to the router device by the first NSP. For example, the public network address assigned by the first NSP may be of a first network addressing scheme and the public network address assigned by the second NSP may be of a second network addressing scheme. The edge device may leverage one or more mapping tables (e.g., Table 1 and/or Table 2) that outline the endpoints (e.g., ports) of the first overlay network and the protocol for using the individual overlay networks. In some embodiments, the fifth data packet includes the first payload/message of the first data packet and further includes a destination address that identifies the customer device.

At block 516, the router device receives a sixth packet with a network address that identifies the second overlay network (e.g., the network address is of a network addressing scheme corresponding to the first NSP). For example, the sixth data packet may include an IP address that identifies a gateway of the second NSP and/or a unique IP address used by the router device that corresponds to the second NSP.

At block 518, the router device sends to a customer device a seventh data packet with a network address indicating a customer device. For example, the first data packet may include a destination IP address, such as, for example, a private network IP address identifying one or more devices of a self-contained network (e.g., of a network addressing scheme corresponding to the self-contained network). The router device may further identify the destination address within the network based on a received public IP address received by the router device. The router device may perform NAT on the first data packet and convert the public IP address (e.g., associated with the first NSP) to a private IP address. For example, one or more entries of a mapping table (e.g., Table 3) may be used to convert the public IP address associated with the first NSP to a private IP address.

Figure 6:
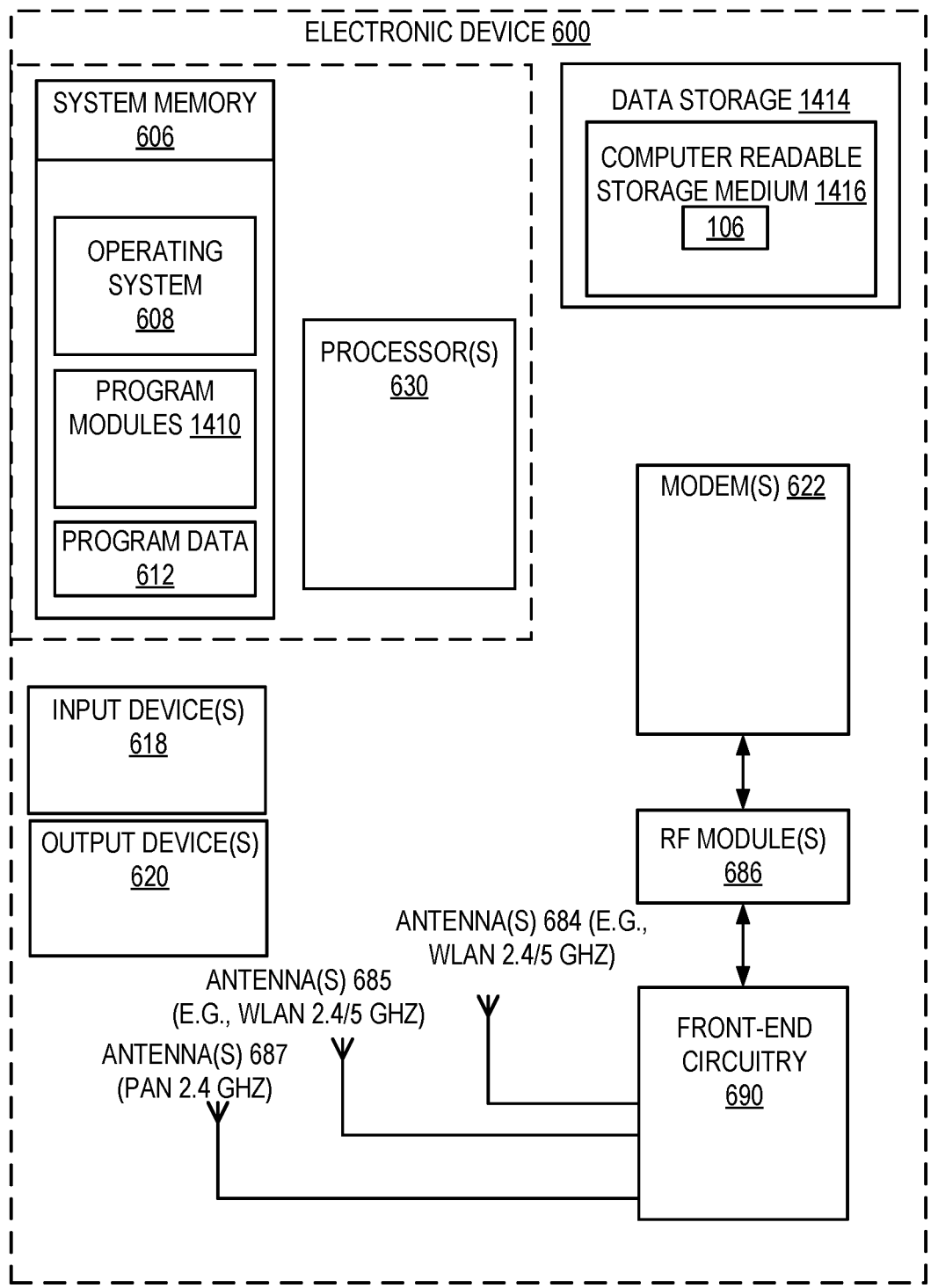
FIG. 6 is a block diagram of a network hardware device with seamless NSP switchover capability according to one embodiment.

FIG. 6 is a block diagram of a network hardware device 600 with seamless NSP switchover capability according to one embodiment. The network hardware device 600 may correspond to any of the nodes or devices described above with respect to FIGS. 1-5. Alternatively, the network hardware device 600 may be other electronic devices, as described herein.

The network hardware device 600 includes one or more processor(s) 630, such as one or more CPUs, microcontrollers, field-programmable gate arrays, or other types of processing devices. The network hardware device 600 also includes system memory 606, which may correspond to any combination of volatile and/or non-volatile storage mechanisms (e.g., one or more memory devices). The system memory 606 stores information that provides operating system component 608, various program modules 610, program data 612, and/or other components. In one embodiment, the system memory 606 stores instructions of methods to control the operation of the network hardware device 600. The network hardware device 600 performs functions by using the processor(s) 630 to execute instructions provided by the system memory 606.

In at least one embodiment, a processing device is operatively coupled to a memory device that stores instructions. The processing device executes instructions to perform various operations, such as those operations described herein.

The network hardware device 600 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 may reside, completely or at least partially, within the computer-readable storage medium 616, system memory 606, and/or within the processor(s) 630 during execution thereof by the network hardware device 600, the system memory 606 and the processor(s) 630 also constituting computer-readable media.

The network hardware device 600 may also include one or more input devices 618 (keyboard, mouse device, specialized selection keys, etc.) and one or more output devices 620 (displays, printers, audio output mechanisms, etc.).

The network hardware device 600 further includes a modem 622 to allow the network hardware device 600 to communicate via wireless connections (e.g., such as provided by the wireless communication system) with other computing devices, such as remote computers, an item providing system, and so forth. The modem 622 can be connected to one or more RF modules 686. The RF modules 686 may be a WLAN module, a WAN module, a PAN module, a GPS module, or the like. The antenna structures (antenna(s) 684, 685, 687) are coupled to the RF circuitry 683, which is coupled to the modem 622. The RF circuitry 683 may include radio front-end circuitry, antenna-switching circuitry, impedance matching circuitry, or the like. The antennas 684 may be GPS antennas, NFC antennas, other WAN antennas, WLAN or PAN antennas, or the like. The modem 622 allows the network hardware device 600 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 622 may generate signals and send these signals to the antenna(s) 684 of a first type (e.g., WLAN 5 GHZ), antenna(s) 685 of a second type (e.g., WLAN 2.4 GHZ), and/or antenna(s) 687 of a third type (e.g., WAN), via RF circuitry 683, and RF module(s) 686 as described herein. Antennas 684, 685, 687 may be configured to transmit in different frequency bands and/or using different wireless communication protocols. The antennas 684, 685, 687 may be directional, omnidirectional, or non-directional antennas. In addition to sending data, antennas 684, 685, 687 may also receive data, which is sent to appropriate RF modules connected to the antennas. One of the antennas 684, 685, 687 may be any combination of the antenna structures described herein.

In one embodiment, the network hardware device 600 establishes a first connection using a first wireless communication protocol, and a second connection using a different wireless communication protocol. The first wireless connection and second wireless connection may be active concurrently. For example, if a network hardware device is receiving a media item from another network hardware device via the first connection and transferring a file to another user device via the second connection simultaneously. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 622 is shown to control transmission and reception via the antenna (684, 685, 687), the network hardware device 600 may alternatively include multiple modems, each of which is configured to transmit/receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices are capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard CDN, but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical, or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments where there is limited broadband Internet infrastructure. The embodiments described herein may provide users in these environments with a content delivery experience that is equivalent to what the users would receive on a traditional broadband Internet connection. The embodiments described herein may be used to optimize deployment for traffic types (e.g., streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both prior to the performance of the identified operation.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An network service provider (NSP) switchover system, comprising:
 a router device storing first data associating internet protocol addresses (IP) of a first private IP addressing scheme corresponding to a first network of devices, IP addresses of a first public IP addressing scheme corresponding to a first NSP, and IP addresses of a second public IP addressing scheme corresponding to a second NSP; and
 an edge device communicatively coupled to the router device using at least one of the first NSP or the second NSP, wherein the edge device stores second data that associates the IP addresses of the first public IP addressing scheme, the IP addresses of the second public IP addressing scheme, and IP addresses of a third public IP addressing scheme, wherein the third public IP addressing scheme operates independent from the first NSP and the second NSP;
 wherein the router device:
  receives, from a first wireless device of the first network of devices, third data comprising a destination address and a first network address of the first private IP addressing scheme, the first network address corresponding to the first wireless device;
determines that a first status of the first NSP does not meet target operational criteria;
determines, based on the first network address and the first status and using the first data, a second network address of the second public IP addressing scheme;
sends fourth data to the edge device using the second NSP, the second data comprising the second network address;

wherein the edge device:
determines, based on the second network address and using the second data, a third network address of the third public IP addressing scheme; and
sends fifth data to a second wireless device associated with the destination address, wherein the third data comprises the third network address.

2. The NSP switchover system of claim 1, wherein the router device further:
receives, from the first wireless device, sixth data comprising the destination address and the first network address;
determines that a second status of the first NSP meets the target operational criteria;
determines, based on the first network address and the first status using the first data, a fourth network address of the first public IP addressing scheme;
sends seventh data to the edge device using the first NSP, the seventh data comprising the fourth network address;

wherein the edge device further:
determines, based on the fourth network address using the second data, a fifth network address of the third public IP addressing scheme; and
sends eighth data to the second wireless device, wherein the eighth data comprises the fifth network address.

3. The NSP switchover system of claim 1, wherein responsive to sending the fifth data to the second wireless device, the edge device:
receives sixth data from the second wireless device, the sixth data comprising the third network address;
determines that a second status of the second NSP does not meet the target operational criteria;
determines, based on the third network address and the second status using the second data, a fourth network address of the first public IP addressing scheme;
sends seventh data to the router device using the first NSP, the seventh data comprising the fourth network address;

wherein the router device:
determines, based on the fourth network address using the first data, the first network address; and
sends eighth data to the first wireless device, the eighth data comprising the first network address.

4. A method comprising:
receiving, by a first wireless device from a second wireless device, a destination address, a first network address of a first network addressing scheme, and a first message;
determining, by the first wireless device, a first status of at least one of a first network service provider (NSP) or a second NSP, wherein the first NSP corresponds to a second network addressing scheme and the second NSP corresponds to a third network addressing scheme;
determining, by the first wireless device based on the first network address and the first status, a second network address of the third network addressing scheme;

sending, by the first wireless device to a third wireless device using the second NSP, the second network address and the first message;
determining, by the third wireless device and based on the second network address, a third network address of a fourth network addressing scheme, wherein the fourth network addressing scheme operates independent from the first NSP and the second NSP; and
sending, by the third wireless device to a fourth wireless device corresponding to the destination address, the third network address and the first message.

5. The method of claim 4, further comprising:
receiving, by the first wireless device from the second wireless, the destination address, the first network address, and a second message;
determining, by the first wireless device, a second status of at least one of the first NSP or the second NSP;
determining, by the first wireless device based on the first network address and the second status, a fourth network address of the second network addressing scheme;
sending, by the first wireless device to the third wireless device using the first NSP, the fourth network address and the second message;
determining, by the third wireless device based on the second network address, a fifth network address of the fourth network addressing scheme; and
sending, by the third wireless device to the fourth wireless device, sixth data comprising the fifth network address.

6. The method of claim 4, further comprising:
receiving, by the third wireless device from the fourth wireless device, the third network address and a second message;
determining, by the third wireless device, a second status of at least one of the first NSP or the second NSP;
determining, by the third wireless device, a fourth network address of the second network addressing scheme based on the third network address and the second status;
sending, by the third wireless device to the first wireless device using the first NSP, the fourth network address and the second message;
determining, by the first wireless device based on the fourth network address, the first network address; and
sending, by the first wireless device to the second wireless device, the first network address and the second message.

7. The method of claim 4, further comprises:
receiving, by the third wireless device from the fourth wireless device, the third network address and a second message;
determining, by the third wireless device, a second status of at least one of the first NSP or the second NSP;
determining, by the third wireless device, a fourth network address of the third network addressing scheme based on the third network address and the second status;
sending, by the third wireless device to the first wireless device using the second NSP, the fourth network address;
determining, by the first wireless device based on the fourth network address, the first network address; and
sending, by the first wireless device to the second wireless device, the first network address.

8. The method of claim 4, wherein the third wireless device is communicatively coupled to the first wireless device through an internet exchange center (IXC).

9. The method of claim 4, wherein the third wireless device is configured in a cloud network that performs one or more cloud-based functions, and wherein sending the fourth network address and the first message to the third wireless device comprises sending the fourth network address and the first message to an ingress node of the cloud network.

10. The method of claim 4, wherein the third wireless device is positioned within a data center associated with the NSP, and wherein the method further comprises receiving, by the third wireless device using an overlay network corresponding to the first NSP, the fourth network address and the first message.

11. The method of claim 4, wherein the second wireless device corresponds to a network of devices comprises a self-contained network with a tiered network topology.

12. The method of claim 4, wherein the first status corresponds to at least one of an availability, a speed, a load, or a liveliness of the at least one of the first NSP or the second NSP.

13. The method of claim 4, further comprising:
generating, by the third wireless device, an Internet protocol detail record (IPDR) associated with a network of devices comprising the second wireless device.

14. A system comprising:
a router device; and
an edge device communicatively coupled to the router device through at least one of a first network service provider (NSP) and a second NSP, wherein the router device is configured to:
receive, from a first wireless device of a network of devices, a destination address, a first network address of a first network addressing scheme, and a first message;
determine a first status of at least one of the first NSP or the second NSP, wherein the first NSP corresponds to a second network addressing scheme and the second NSP corresponds a third network addressing scheme;
determine, based on the first network address and the first status, a second network address of the third network addressing scheme;
send, by the first wireless device to the edge device using the second NSP, the second network address and the first message;

wherein the edge device is configured to:
determine, based on the second network address, a third network address of a fourth network addressing scheme, wherein the fourth network addressing scheme operates independent from the first NSP and the second NSP; and
send, to a second wireless device corresponding to the destination address, the third network address and the first message.

15. The system of claim 14, wherein, the edge device is further configured to:
receive, from the second wireless device, the third network address and a second message;
determine a second status of at least one of the first NSP or the second NSP;
determine, based on the third network address and the second status, a fourth network address of the second network addressing scheme; and
send to the router device using the first NSP, the fourth network address and the second message; and
wherein the router device is further configured to:
determine, based on the fourth network address, the first network address; and
send, to the second wireless device, the first network address and the second message.

16. The system of claim 14, wherein the edge device is communicatively coupled to the router device through an internet exchange center (IXC).

17. The system of claim 14, wherein the edge device is configured within a cloud network that performs one or more cloud-based functions.

18. The system of claim 14, wherein the edge device is positioned within a data center associated with the first NSP, and wherein the edge device is configured further to receive, using an overlay network corresponding to the first NSP, the fourth network address and the first message.

19. The system of claim 14, wherein the network of devices comprises a self-contained network with a tiered network topology.

20. The system of claim 14, wherein the first status corresponds to at least one of an availability, a speed, a load, or a liveliness of the at least one of the first NSP or the second NSP.

* * * * *